(12) United States Patent
Barclay et al.

(10) Patent No.: US 7,412,228 B2
(45) Date of Patent: Aug. 12, 2008

(54) METHOD FOR NOTIFYING A PRIMARY WIRELESS UNIT OF GROUP CALLING PLAN ACTIVITY

(75) Inventors: Deborah Lewandowski Barclay, Winfield, IL (US); David S Benco, Winfield, IL (US); Sanjeev Mahajan, Naperville, IL (US); Thomas Lee McRoberts, Naperville, IL (US); Raymond Leroy Ruggerio, Glenview, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 315 days.

(21) Appl. No.: 10/883,142

(22) Filed: Jul. 1, 2004

(65) Prior Publication Data
US 2006/0003748 A1    Jan. 5, 2006

(51) Int. Cl.
*H04B 7/00* (2006.01)
(52) U.S. Cl. .................. 455/405; 455/406; 455/407; 455/408; 379/124; 379/125; 379/127; 379/130; 379/132

(58) Field of Classification Search ............... 455/405, 455/406, 407, 408, 414.1, 411; 379/114.2, 379/115.01, 121.03; 705/1
See application file for complete search history.

(56) References Cited

U.S. PATENT DOCUMENTS

| 6,014,089 A | | 1/2000 | Tracy et al. ............... 455/466 |
| 6,131,024 A | * | 10/2000 | Boltz ..................... 455/405 |
| 6,757,531 B1 | | 6/2004 | Haaramo et al. ......... 455/414.1 |
| 6,923,370 B2 | * | 8/2005 | Gotfried et al. ............ 235/382 |
| 2002/0138296 A1 | | 9/2002 | Holmes ....................... 705/1 |
| 2004/0235457 A1 | * | 11/2004 | Florkey et al. ........... 455/414.1 |
| 2005/0096009 A1 | * | 5/2005 | Ackley ..................... 455/405 |
| 2005/0113130 A1 | * | 5/2005 | Weinzierl ................ 455/550.1 |

FOREIGN PATENT DOCUMENTS

EP    0612191 A    8/1994

* cited by examiner

*Primary Examiner*—Duc Nguyen
*Assistant Examiner*—Julio R Perez
(74) *Attorney, Agent, or Firm*—John B MacIntyre

(57) ABSTRACT

The present invention provides a method for notifying a primary wireless unit in a group calling plan that a wireless unit in the group calling plan has call activity. An MSC determines if there is call activity on a wireless phone. The MSC determines if the wireless phone is a member of a call monitoring group. If so, the MSC records call information related to the call activity and sends the call information to the primary wireless unit.

17 Claims, 2 Drawing Sheets

METHOD FOR NOTIFYING A PRIMARY WIRELESS UNIT OF GROUP CALLING PLAN ACTIVITY

FIELD OF THE INVENTION

The present invention relates generally to wireless communication systems, and more particularly to group wireless calling plans.

BACKGROUND OF THE INVENTION

Wireless phones, sometimes referred to as cellular phones or mobile phones, allow users to make calls without being tied into a fixed location. Cellular calling plans give users access to a wireless communication network, and are customizable to provide various features and options to users.

One feature that has been provided by cellular service providers is group calling plans. Group calling plans allow multiple wireless phones to be associated with a single subscriber account. This simplifies billing and accounting, and allows the owner of the account to monitor phone usage.

One problem with current group calling plans is that the information is only provided on a periodic basis, typically monthly. This wait can lead to a significant response time delay when dealing with issues or problems with wireless phones that are part of the group calling plan.

Therefore, a need exists for a method that allows a primary user to receive information about usage of other members of the group calling plan without having to wait for the monthly detailed billing statement to arrive.

BRIEF SUMMARY OF THE INVENTION

The present invention provides a method for notifying a primary wireless unit of call activity of other members of the wireless calling phone group. An MSC or other call processing entity determines if there is call activity on a wireless phone. Call activity includes origination of calls from the wireless phone and also the receiving of incoming calls at the wireless phone.

The MSC then determines if the wireless phone is a member of a call monitoring group, which is a feature that can be enabled and disabled by the primary wireless unit once subscribed to. The primary wireless unit can monitor a single member of the call monitoring group, multiple members of the call monitoring group, or all members of the call monitoring group.

If the wireless phone is a member of a call monitoring group, the MSC records call information. The call information may include the directory number of the calling phone, the directory number of the called phone, the date of the call, the time that the call was made, or the duration of the call.

At some point, the MSC sends the recorded call information to the primary wireless unit. In an exemplary embodiment, the call information is sent to the primary wireless unit based upon a predetermined amount of mobile phone usage. Alternately, the call information is sent after a predetermined period of time or after predetermined number of call information messages have been collected.

In an exemplary embodiment, the MSC first sends the recorded call information to an SMS Center, which performs appropriate formatting and scheduling. In alternate embodiments, the information is sent to the primary wireless unit via email or instant messaging (IM).

DETAILED DESCRIPTION OF THE INVENTION

Figure 1:
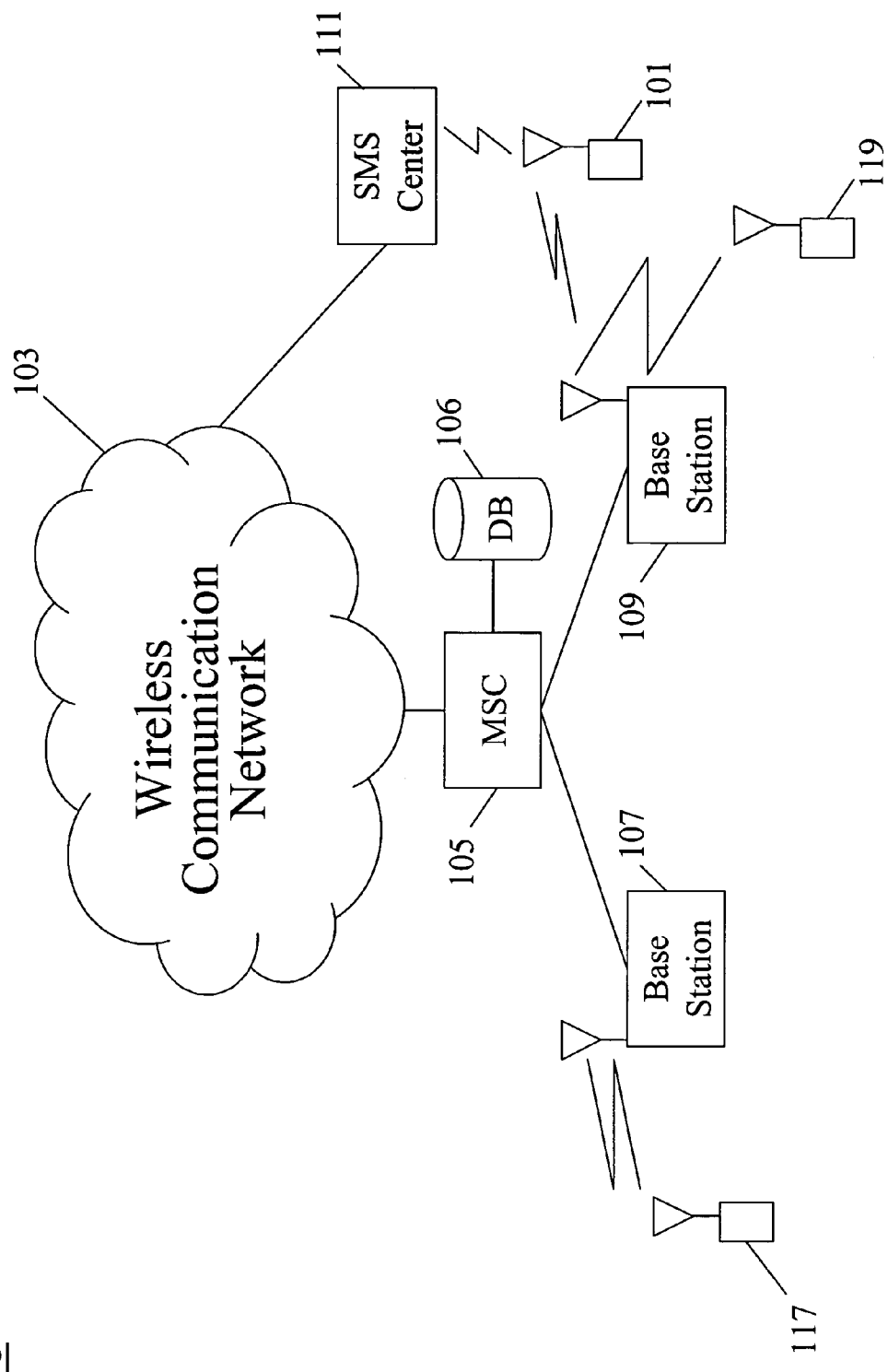
FIG. 1 depicts a communication system in accordance with an exemplary embodiment of the present invention.
Figure 2:
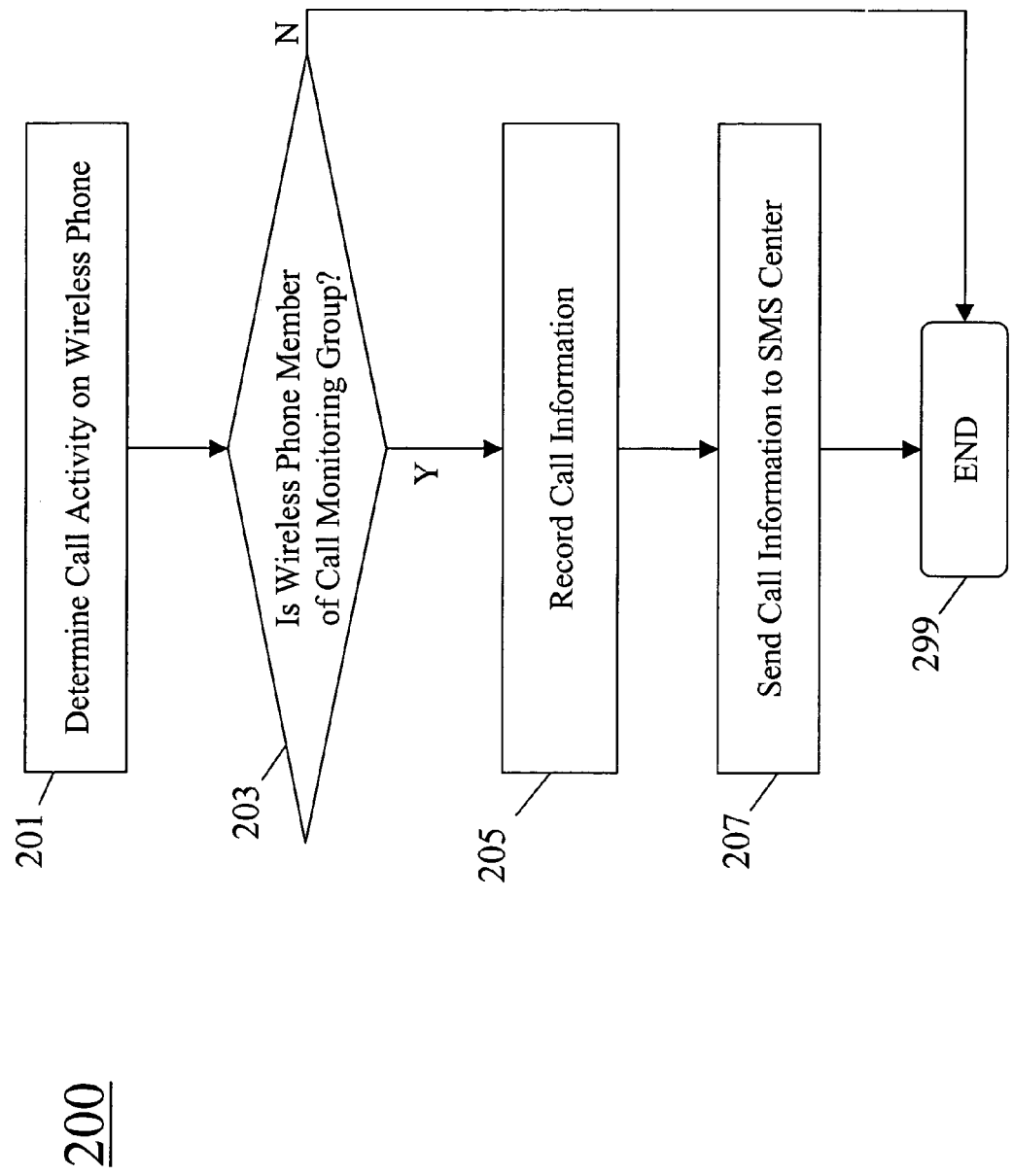
FIG. 2 depicts a flowchart of a method for notifying a primary wireless unit of call activity of other members of the wireless calling phone group in accordance with an exemplary embodiment of the present invention.

The present invention can be better understood with reference to FIGS. 1 and 2. FIG. 1 depicts a communication system 100 that includes a wireless communication network 103. Communication system 100 may include a wireline communication network, such as the Public Switched Telephone Network (PSTN) and a plurality of wireless networks, but only wireless communication network 103 is depicted in FIG. 1 for clarity.

Wireless communication network 103 includes Mobile Switching Center (MSC) 105, base stations 107 and 109, and Short Message Service (SMS) Center 111.

Wireless communication network 103 can utilize any wireless protocol, including but not limited to analog, such as AMPS, TACS and NMT, or digital, such as GSM, TDMA, CDMA, GPRS, EDGE, IS-95, IS-95B, HDR, WCDMA, and CDMA2000. Base stations 107 and 109 communicate with wireless communication network 103 via MSC 105 and communication over the air with wireless units 117 and 119, respectively. Although only two base stations, one MSC, and two wireless units are depicted in FIG. 1 for clarity, it should be understood that wireless communication network 103 typically includes a plurality of MSCs, each of which communicates with a plurality of base stations, and each base station services a plurality of wireless units.

MSC 105 processes call and service request initiated by one of the wireless units 119 and allocates the required transmission and signaling resources. A typical communication path between MSC 105 and SMS Center 111 would utilize SS7 signaling protocols such as ANSI-41 or GSM-MAP. Base stations 107 and 109 communicate with wireless communication network 103 and communication over the air with wireless units 117 and 119, respectively. Although only two base stations and two wireless units are depicted in FIG. 1 for clarity, it should be understood that wireless communication network 103 typically includes a plurality of base stations, and each base station services a plurality of wireless units.

Database (DB) 106 is coupled to MSC 105 and provides storage for call records and group calling plan information. The information in DB 106 is accessed by MSC 105 to determine if a calling or called wireless unit is a member of a group calling plan, to determine if the primary wireless unit in the calling plan has enabled call monitoring, and to retrieve relevant information pertaining to the call to be sent to the primary wireless unit, preferably via SMS center 111.

Base stations 107 and 109 provide an over the air interface to mobile stations 101, 117, and 119. Base stations 107 and 109 are coupled to MSC 105 via communication lines.

SMS Center 111 is coupled to wireless communication network 103. SMS Center 111 receives messages and information from wireless communication network 103 and communicates SMS messages to wireless unit 101 utilizing an over-the-air interface.

Wireless units 101, 117, and 119 are members of a group calling plan. Such plans allow multiple wireless phones to be combined on a single calling plan and utilize the same service plans, such as minutes, features, etc. This allows a group of users, such as a family or work group, to have cellular service without having multiple billing accounts. In accordance with the present invention, one of the wireless phones is designated as the primary wireless unit. In FIG. 1, wireless unit 101 is designated as the primary wireless unit. The primary wireless unit can monitor the usage of other wireless phones in the group calling plan. In accordance with the present invention, the primary wireless unit can monitor account usage in near real-time, thereby providing an improvement over waiting for a detailed monthly billing statement.

FIG. 2 depicts a flowchart 200 of a method for notifying a primary wireless unit of call activity of other members of the wireless calling phone group in accordance with an exemplary embodiment of the present invention.

The MSC determines (201) if there is call activity on a wireless phone. Call activity includes origination of calls from the wireless phone and also the receiving of incoming calls at the wireless phone.

The MSC determines (203) if the wireless phone is a member of a call monitoring group. The call monitoring feature is preferably a feature that is subscribed to and that can be enabled and disabled by the primary wireless unit. In an exemplary embodiment of the present invention, the primary wireless unit enables the call monitoring feature by entering a feature code, such as *88. In an exemplary embodiment, the feature code is followed by the phone number of the wireless unit in the group calling plan that the primary wireless unit desires to monitor. The primary wireless unit can preferably enter the phone number of multiple wireless units in the calling group, which then enables monitoring of all wireless units in the group calling plan whose numbers follow the feature code. In an exemplary embodiment, when the primary wireless unit enters the feature code without any phone numbers following, the communication system enables call monitoring for all wireless units in the group calling plan.

If the wireless phone is not a member of a call monitoring group, the processing ends (299) and typical call processing occurs. If the wireless phone is a member of a call monitoring group, the MSC records (205) call information. The call information may include the directory number of the calling phone, the directory number of the called phone, the date of the call, the time that the call was made, or the duration of the call.

The MSC sends (207) the call information to an SMS Center. SMS Center 111 performs appropriate formatting and scheduling and sends the message to primary wireless unit 101. In alternate embodiments, the information is sent to primary wireless unit 101 via email or instant messaging (IM).

The present invention also allows the primary wireless unit to provide billing services based upon mobile phone usage. For example, a lawyer or consultant can counsel a client over a wireless unit that is part of a group plan in accordance with an exemplary embodiment of the present invention. The primary wireless unit can monitor, in near real-time, wireless phone usage and generate appropriate billing for the call based upon the duration of the call, a billing code associated with a user of the group wireless phone, and can bill the proper client based upon the directory number of the phone connected to the group calling plan wireless unit.

While this invention has been described in terms of certain examples thereof, it is not intended that it be limited to the above description, but rather only to the extent set forth in the claims that follow.

We claim:

1. A method for notifying a primary wireless unit in a group calling plan that a wireless unit in the group calling plan has call activity, the method comprising:
   determining if there is call activity on a wireless phone;
   determining if the wireless phone is a member of a call monitoring group that has subscribed to a call monitoring service, wherein the call monitoring service can be enabled and disabled by the primary wireless unit, and wherein the step of enabling and disabling the call monitoring service comprises entering a feature code by the primary wireless unit;
   if the wireless phone is a member of the call monitoring group, recording call information related to the call activity; and
   sending the call information to the primary wireless unit.

2. A method for notifying a primary wireless unit in a group calling plan that a wireless unit in the group calling plan has call activity in accordance with claim 1, the method further comprising the step of entering, subsequent to the feature code, a phone number of a wireless unit in the group calling plan that the primary wireless unit desires to monitor.

3. A method for notifying a primary wireless unit in a group calling plan that a wireless unit in the group calling plan has call activity in accordance with claim 1, the method further comprising the step of entering, subsequent to the feature code, a plurality of phone numbers of wireless units in the group calling plan that the primary wireless unit desires to monitor.

4. A method for notifying a primary wireless unit in a group calling plan that a wireless unit in the group calling plan has call activity in accordance with claim 1, the method further comprising the step of monitoring all wireless units in the group calling plan when no phone numbers are entered subsequent to the feature code.

5. A method for notifying a primary wireless unit in a group calling plan that a wireless unit in the group calling plan has call activity in accordance with claim 1, wherein the step of recording call information related to the call activity comprises recording the directory number of the calling phone.

6. A method for notifying a primary wireless unit in a group calling plan that a wireless unit in the group calling plan has call activity in accordance with claim 1, wherein the step of recording call information related to the call activity comprises recording the directory number of the called phone.

7. A method for notifying a primary wireless unit in a group calling plan that a wireless unit in the group calling plan has call activity in accordance with claim 1, wherein the step of recording call information related to the call activity comprises recording the date of the call.

8. A method for notifying a primary wireless unit in a group calling plan that a wireless unit in the group calling plan has call activity in accordance with claim 1, wherein the step of recording call information related to the call activity comprises recording the time that the call was made.

9. A method for notifying a primary wireless unit in a group calling plan that a wireless unit in the group calling plan has call activity in accordance with claim 1, wherein the step of recording call information related to the call activity comprises recording the duration of the call.

10. A method for notifying a primary wireless unit in a group calling plan that a wireless unit in the group calling plan has call activity in accordance with claim 1, wherein the step of recording call information related to the call activity comprises recording a billing code associated with a user of the group wireless phone.

11. A method for notifying a primary wireless unit in a group calling plan that a wireless unit in the group calling plan has call activity in accordance with claim 1, the method further comprising the step of determining a client account to bill based at least in part upon the directory number of a phone connected to a wireless phone that is a member of the group calling plan.

12. A method for notifying a primary wireless unit in a group calling plan that a wireless unit in the group calling plan has call activity in accordance with claim 1, wherein the step of sending the call information to the primary wireless unit comprises sending the call information to a Short Message Service (SMS) Center.

13. A method for notifying a primary wireless unit in a group calling plan that a wireless unit in the group calling plan has call activity in accordance with claim 1, wherein the step of sending the call information to the primary wireless unit comprises sending an SMS message to the wireless unit.

14. A method for notifying a primary wireless unit in a group calling plan that a wireless unit in the group calling plan has call activity in accordance with claim 1, wherein the step of sending the call information to the primary wireless unit comprises sending an Instant Message to the wireless unit.

15. A method for notifying a primary wireless unit in a group calling plan that a wireless unit in the group calling plan has call activity in accordance with claim 1, wherein the step of sending the call information to the primary wireless unit is triggered based upon mobile phone usage.

16. A method for notifying a primary wireless unit in a group calling plan that a wireless unit in the group calling plan has call activity in accordance with claim 1, wherein the step of sending the call information to the primary wireless unit is performed after a predetermined period of time.

17. A method for notifying a primary wireless unit in a group calling plan that a wireless unit in the group calling plan has call activity in accordance with claim 1, wherein the step of sending the call information to the primary wireless unit is performed after a predetermined number of call information messages have been collected.

\* \* \* \* \*